Patented July 10, 1928.

1,676,562

UNITED STATES PATENT OFFICE.

OSKAR KNECHT AND HANS BRÜTSCH, OF BASEL, SWITZERLAND, ASSIGNORS TO SOCIETY "CHEMICAL WORKS FORMERLY SANDOZ," OF BASEL, SWITZERLAND.

MANUFACTURE OF TRISAZOIC COLORING MATTERS.

No Drawing. Application filed December 16, 1924, Serial No. 756,328, and in France January 11, 1924.

Up to the present 1-aryl-aminonaphthalene-sulfonic acids have been specially employed for the preparation of mono- and disazo colors for wool. It has been discovered that when these 1-aryl-aminonaphthalene sulfonic acids are introduced as final components of trisazo colors, coloring matters for cotton are obtained which are extremely fast to light and resistant to washing. These new coloring matters are prepared on the following principle. A diazotized derivative of the benzene or naphthalene series is coupled with a diazotizable component; the intermediate product is diazotized again and is combined with the same or another diazotizable component and then, after a further diazotization, it is coupled with a 1-aryl-aminonaphthalene sulfonic acid. These colors are in accordance with the formula:—

Benzene or naphthalene derivative-azo

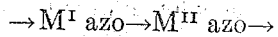

1 - aryl - aminonaphthalene sulfonic acid; where $M^I$ and $M^{II}$ represent the residues of the diazotizable components such as 1-naphthylamine, Cleve's 1-naphthylamine sulfonic acid etc.

Example I.

The monoazo color obtained by diazotizing 22.3 parts of Cleve's 1-naphthylamine sulfonic acid and coupling in acetic solution with 22.3 parts of the same acid, is diazotized with the help of hydrochloric acid and of 6.9 parts of sodium nitrite and is combined in acetic solution with 22.3 parts of Cleve's acid. The diazo color thus formed is isolated and then is shaken up with water, 6.9 parts of sodium nitrite are added and the mixture is poured at a temperature of 0 to 5° C., into an excess of dilute hydrochloric acid. When the diazotization is finished, the diazoic is introduced into a solution of 32.1 parts of 1-phenyl-aminonaphthalene-8-sulfonate of sodium and the excess of mineral acid is neutralized by sodium acetate.

After agitation for several hours it is allowed to remain for 12 hours at ordinary temperature, then heated and made alkaline with sodium carbonate, and thereupon salted out and filtered off. The dry color is a grey-black powder adapted to dye cotton grey and is extremely fast to light and to washing.

The product obtained according to this example has the following formula:

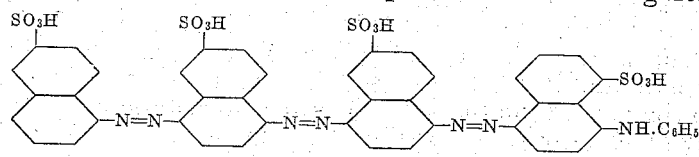

Example II.

18.7 parts of 1-methyl-2-aminobenzene-4-sulfonic acid are diazotized and coupled in acetic solution with 22.3 parts of Cleve's 1-naphthylamine sulfonic acid. The monoazo color is diazotized in its turn by means of sodium nitrite and hydrochloric acid and is mixed with a solution of 22.3 parts of Cleve's acid. The mineral acid is neutralized by sodium acetate. The disazo color is isolated, diazotized with hydrochloric acid and sodium nitrite and is combined with a solution of 32.1 parts of 1-phenyl-aminonaphthalene-8-sulfonate of sodium. In this case also the excess of mineral acid is neutralized by sodium acetate. The rest of the process is carried out as in Example I.

The dry color is a grey-black powder dyeing cotton greenish-grey; it is extremely fast to light and to washing.

The product obtained according to this example has the following formula:

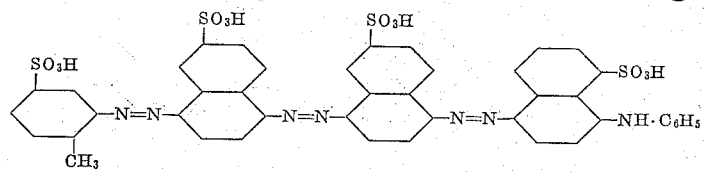

Example III.

18.7 parts of 1-methyl-2-aminobenzene-4-sulfonic acid are diazotized, then, with the addition of ice, a warm solution at about 45° C. of 18 parts of hydrochlorate of α-naphthylamine is poured into the diazoic solution. The free acid of the color is precipitated, filtered out and transformed into its sodium salt by means of dilute caustic soda. This is diazotized with sodium nitrite after the addition of hydrochloric acid; the diazotized combination is filtered and then is mixed with a solution of 22.3 parts of Cleve's acid and the free mineral acid is neutralized by an excess of sodium acetate. The disazoic color is isolated and dissolved again and is diazotized by means of hydrochloric acid and of sodium nitrite. The diazoic compound is mixed with 32.1 parts of 1-phenyl-amino-naphthalene-8-sulfonate of sodium, then the mass is heated, and after having been rendered alkaline with sodium carbonate, the color is precipitated by common salt.

The color thus obtained dyes cotton a bluish-grey which is very fast to light and to washing.

The product obtained according to this example has the following formula:

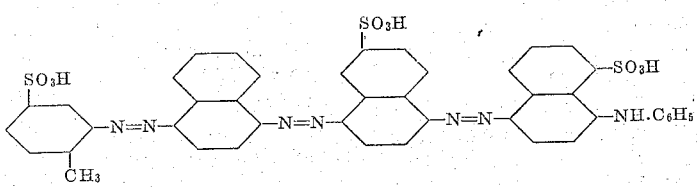

Example IV.

By replacing the 18.7 parts of 1-methyl-2-aminobenzene-4-sulfonic acid in Example II by 10.7 parts of p-toluidine and carrying on the process after that in the same way, a color is obtained which dyes cotton a bluish-grey which is very fast to light and to washing.

Example V.

The monoazo color, prepared according to Example I, is diazotized as in that case; then the diazoic is mixed with 18 parts of hydrochloride of α-naphthylamine and the excess of mineral acid neutralized by sodium acetate. The color precipitates in the form of its free acid, it is filtered and transformed into its sodium salt by dilute caustic soda. It is diazotized in its turn and is coupled, in acetic solution, with 32.1 parts of 1-phenyl-aminonaphthalene-8-sulfonate of sodium. The color obtained from the solution made alkaline by sodium carbonate dyes cotton grey which is very fast to light and to washing.

Example VI.

14.3 parts of α-naphthylamine are diazotized and coupled in acetic solution with 22.3 parts of Cleve's 1-naphthylamine sulfonic acid. When the combination is complete, it is rendered alkaline with caustic soda and the sodium salt of the monoazo color is filtered out. This is then diazotized by means of sodium nitrite and hydrochloric acid, mixed with a solution of 22.3 parts of Cleve's 1-naphthylamine sulfonic acid and the mineral acid is neutralized by sodium acetate. The disazoic color, purified by filtration, is diazotized in the usual way and coupled at a temperature of about 5° C. with a solution of 32.1 parts of 1-phenyl-aminonaphthalene-8-sulfonate of sodium; it is neutralized immediately by sodium acetate. When the combination is completed, it is heated and rendered slightly alkaline by sodium carbonate and the color is precipitated by common salt. This product dyes cotton black, is extremely fast to light and to washing and very convenient for discharge effects.

Example VII.

The monoazo color obtained by diazotizing 15 parts of p-aminoacetanilide and by combining it in acetic solution with 22.3 parts of Cleve's 1-naphthylamine-sulfonic acid, is filtered in the form of its sodium salt. This salt is diazotized again by means of sodium nitrite and hydrochloric acid and is coupled in acetic solution with 22.3 parts of Cleve's 1-naphthylamine sulfonic acid. The disazoic color is purified by filtering it and is diazotized by means of sodium nitrite and hydrochloric acid and mixed with 32.1 parts of 1-phenylaminonaphthalene-8-sulfonate of sodium as in Example VI.

The dry color is a grey black powder dyeing cotton from grey to black. It is very fast to light and to washing.

The product obtained according to this example has the following formula:

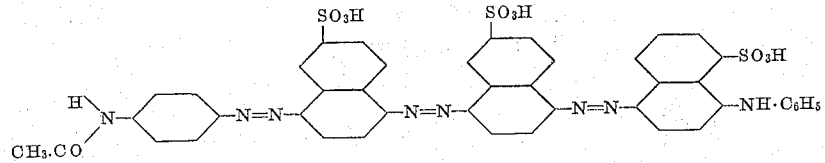

Example VIII.

If the final component in Example I is replaced by the same quantity of Cleve's 1-phenyl-aminonaphthalene sulfonic acid, a color is obtained which dyes cotton a greyish-blue which is very fast to light and to washing.

What we claim is:

1. A process for the manufacture of trisazoic coloring matters, consisting in coupling a diazo-derivative of the benzene and naphthalene series with a diazotizable component of the naphthylamine series, again diazotizing the intermediate product thus obtained, combining the same with a further diazotizable component of the naphthylamine series, rediazotizing again and finally coupling with a 1-aryl-aminonaphthalene-sulfonic acid.

2. As new articles of manufacture the herein described trisazoic coloring matters, having the following general formula

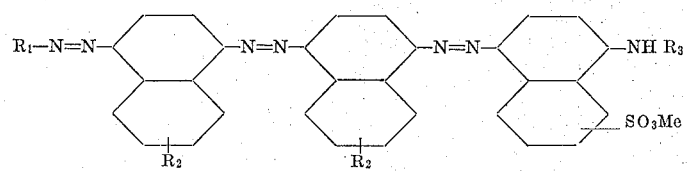

wherein $R_1$ stands for a benzene- or naphthalene derivative, $R_2$ for a hydrogen atom or the group $SO_3Me$, $R_3$ for an aromatic radical and Me for an inorganic radical, these dyestuffs constituting grey-black powders suitable for dyeing cotton of grey to black tints extremely fast to light and washing.

In witness whereof we have hereunto signed our names this 4th day of December, 1924.

OSKAR KNECHT.
HANS BRÜTSCH.